United States Patent

Bencini

[11] 3,888,574
[45] June 10, 1975

[54] MECHANISM FOR SPEED REDUCTION AND STOPPING THE FILM DRIVE FOR USE IN CINEMATOGRAPHIC PROJECTORS

[76] Inventor: Roberto Bencini, c/o Dr. Ing. Misitano A.G., Via Padova, 217, 20-27 Milan, Italy

[22] Filed: Feb. 4, 1974

[21] Appl. No.: 439,559

[30] Foreign Application Priority Data
Feb. 15, 1973 Italy .................................... 20449

[52] U.S. Cl. ............... 352/194; 352/169; 352/180; 226/62
[51] Int. Cl. ............................................. G03b 1/22
[58] Field of Search ........... 352/191, 194, 195, 196, 352/169, 180; 226/62, 70, 71

[56] References Cited
UNITED STATES PATENTS
| | | | |
|---|---|---|---|
| 3,261,654 | 7/1966 | Faber | 352/169 X |
| 3,536,389 | 10/1970 | Reinsch | 352/191 X |
| 3,672,755 | 6/1972 | Radl | 352/191 X |

*Primary Examiner*—Monroe H. Hayes

[57] ABSTRACT

The mechanism is provided to reduce the speed and stop the drive of the film for use in cinematographic projectors.

The invention resides in the provision of an elongated cam member displaceable between three operating positions, pusher means located on each side of the said elongated cam member and mounted to be displaceable laterally of the elongated cam member, one pusher means being adapted to co-operate with further cam means and the other pusher means being adapted to co-operate with the claw end, one position of the cam member corresponding to the inoperative position of both pusher means, a second position of the elongated cam member effecting movement of said other pusher means to displace the claw end such that one of the first and second cams ceases to reciprocate the claw end, such that film transport ceases, the third position of the elongated cam member coupling the pusher means so that said further cam means periodically causes said pusher means to inhibit the reciprocation of said claw end which results from the action of one of said first and second cams such that the speed of film transport is reduced.

3 Claims, 2 Drawing Figures

MECHANISM FOR SPEED REDUCTION AND STOPPING THE FILM DRIVE FOR USE IN CINEMATOGRAPHIC PROJECTORS

This invention relates to a mechanism for speed reduction and stopping the film drive for use in cinematographic projectors.

The mechanism is more specifically for use in projectors in which the film is not driven by toothed wheels, but is driven only by a claw drive of known construction.

In this known claw drive, the claw end follows a rectangular path whilst the claw is driven by a pair of co-axial cams, one of these cams acting to reciprocate the claw end parallel to the film path past the claw and the other cam acting to reciprocate the claw end normally of said path, whereby the claw end engages successive perforations in the film and intermittently engages the film to produce a continuous film displacement.

This known device may be adapted by inhibiting the reciprocation of the claw end parallel to the film path. This feature is achieved by providing a third cam which acts on the claw end to prevent the claw end from being reciprocated by that one of the co-axial cams which causes movement parallel to the film path. The known claw is mounted for pivotal movement parallel to the film path by means of a pivotal connection to the cineprojector frame. It is also mounted on two ball supports which permits swinging movements of the claw end normal to the film path.

According to the present invention there is provided a mechanism for speed reduction and stopping of the film drive for use in cinematographic projectors, comprising a per se known claw drive acted on by first and second cams so as to give the claw end a rectangular profiled path, an elongated cam member displaceable between three operating positions, pusher means located on each side of the said elongated cam member and mounted to be displaceable laterally of the elongated cam member, one pusher means being adapted to co-operate with further cam means and the other pusher means being adapted to co-operate with the claw end, one position of the cam member corresponding to the inoperative position of both pusher means, a second position of the elongated cam member effecting movement of said other pusher means to displace the claw end such that one of the first and second cams ceases to reciprocate the claw end, such that film transport ceases, the third position of the elongated cam member coupling the pusher means so that said further cam means periodically causes said pusher means to inhibit the reciporcation of said claw end which results from the action of one of said first and second cams such that the speed of film transport is reduced.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

DETAILED DESCRIPTION OF THE PREFERRED EMBODIMENT

For the purpose of clarity the description of the device will be made under the following headings:
1 The Assembly of the claw for driving the film;
2 The Drive for the claw;
3 The Mechanism for reducing the speed of, and stopping the film;
4 The Mode of Operation.

1 The Assembly of the claw for drawing the film

Figure 2:
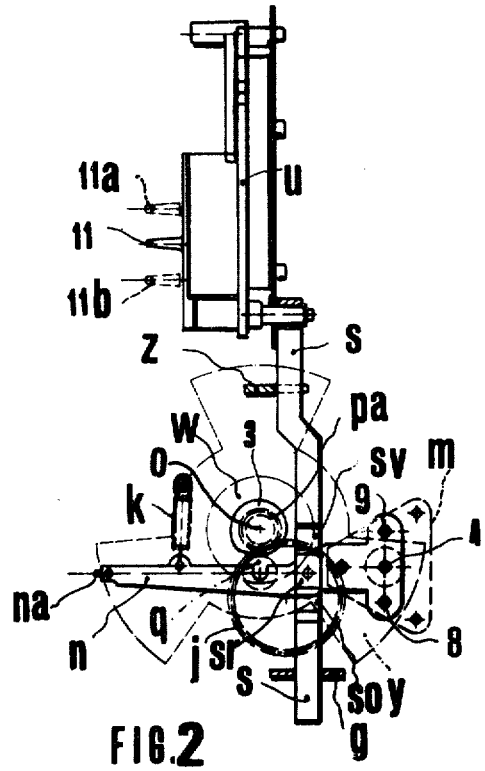
FIG. 2 shows a sectional view taken in a plane normal to that of FIG. 1.

The claw $n$ is mounted for pivotal movement in the plane of FIG. 2 by means of a pivot connection 4. In addition, the claw $n$ is laterally supported to resist movement normal to said plane by means of ball supports 8,9 on the cineprojector frame. A resilient member $m$, shown in dotted line in FIG. 2, is so mounted on the stationary frame $(x)$ as to bias the claw $n$ downwards (namely perpendicularly to the plane of the FIG. 2). This biasing enables the claw $n$ to be driven by means of a cam W. A cylindrical spring $k$ is arranged to bias the claw $n$ into contact with a second cam 3.

The free end of the claw $n$ engages perforations in the film being projected so as to intermittently and directly displace the film. It will be noted that this avoids the use of toothed drive wheels. The path of the free end ($na$) of the claw is a rectangle the plane of which lies perpendicular both to the plane of FIG. 2 and of the claw $n$.

2 The Drive for the Claw

The claw $n$ is associated with a flat roller $q$ co-operating with the cam 3 so as to reciprocate the claw end $na$ parallel to the film path which lies in the plane of the FIG. 2. The first cam W, its profile can be seen in FIG. 1, reciprocates the claw end $na$ in a direction perpendicular to the plane of the FIG. 2, that is perpendicular to the path of travel of the film. The rotary movement of the cam W is effected by means of a toothed wheel $j$ which meshes with a toothed pinion $pa$. The tooted pinion $pa$ is mounted on a spindle $o$ which drives the cam W and rotary shutter $y$. The spindle $o$ is provided at one end with a toothed pinion $d$ and the pinion $d$ meshes with a toothed wheel $r$ made of plastics material. Toothed wheel $r$ has a face which provides a face cam $cr$. This construction ensures synchronous motion of the rotary shutter $y$, the face cam $cr$, the cam W and the reciporcation of the claw $n$.

3 The Mechanism for reducing the speed of, and stopping, the film

A fourth cam $s$, which is a "spindle" cam made of elastic material such a NYLON (NYLON is a registered trade mark), is mounted so as to be capable of reciprocation between supports z,g. One end of the cam $s$, the upper end in FIG. 2, is formed with an elongate aperture $5a$ which receives and co-operates with a cylindrical projection 5. The projection 5 is at one end of control lever $u$, the lever $u$ being capable of reciprocation from the outside by an operator. The control lever $u$ can be displaced between three operating positions. These are an upper position $11a$, a lower position $11b$ and an intermediate position 11.

The cam s is formed with a tapered intermediate section sr, an upper elbow profiled section sv and a lower broadened section so. The sections sv and so, as can be seen in FIG. 1, project laterally of the longitudinal axis of the cam s, with the section sv projecting towards the rotary shutter y and the section so projecting towards the face cam cr.

A pair of pusher-stems 1,10 are mounted to reciprocate longitudinally thereof by means of supports 7,77 respectively, the supports 7,77 being carried by the frame x. With the control lever u in its lower depressed position 11b, the pusher-stem 1 is displaced to right by section sv (FIG. 1) and the pusher stem 10 remains inoperative. With the control lever u raised to its upper, raised position 11a, the section so is positioned between the pusher-stems 1,10 and causes these to be displaced to a position in which they are driven in synchronism by the face cam cr. The face cam cr during its rotation places the cam s under stress in the manner of a beam supported at its ends z, g.

4. The Mode of Operation

Figure 1:
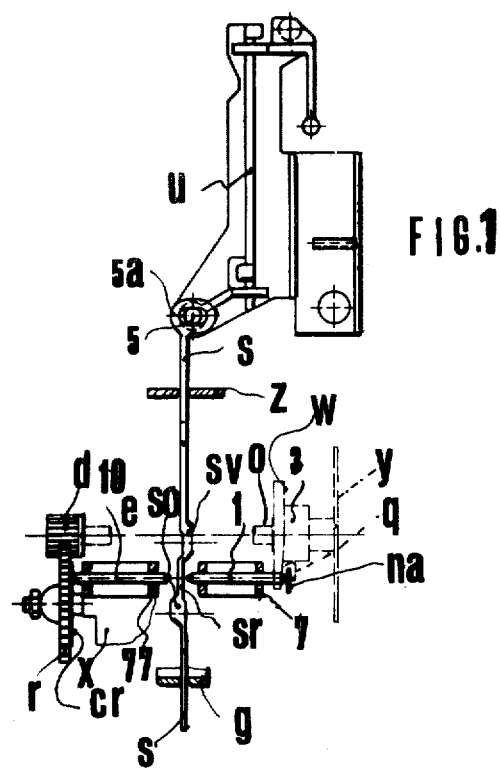
FIG. 1 shows, in partial section, an elevational view of a film projector film drive including the novel speed reduction and stop mechanism in its normal mode of operation.

With lever u in the position 11 shown in FIG. 1 the film is projected at normal speed because the cam s is inoperative. The reduced or tapered portion sr of cam s cannot co-operate with either the pusher-stem 1 or the pusher-stem 10. Thus, the claw n is influenced only by the cams W and 3. When the lever u is displaced to its upper position 11a, then corresponding displacement of cam s causes its section so to be positioned between and in contact with, the pusher-stems 1,10. This positioning causes the pusher-stems 1,10 to be reciprocated in synchronism by the face cam cr. On each revolution of the toothed wheel r, the face cam cr, causes pusher-stem 10 to push pusher-stem 1 to displace the free end na of the claw n. The effect of this displacement of end na is to cancel the effect of spring m which results in the termination of movement of the claw end na perpendicular to the plane of FIG. 2. Reciprocation of the claw n is thus prevented once for every two revolutions of the cams (W,3) and this achieves a speed reduction of 1 to 3. For example a speed reduction from 24 pictures/sec. to 8 pictures may be obtained.

With the lever u in its, lower depressed position 11b, it follows that the cam s is positioned with section sv operative. The section sv displaces only the pusher-stem 1 to the right and maintains the same in this position. As a result the end na is displaced for the duration that lever u is in position 11b and this displacement renders cam W inoperative so far concerns claw n. At the same time, the face cam cr is rendered inoperative as regards claw n, since the pusher-stem 10 is located in its inoperative position. Under these conditions projection of the film picture is stopped.

It is remarked that in the lower, depressed position 11b of lever u, the cam s is required to elastically flex. This is rendered possible by a suitable choice of the material for the cam s which for example, may be a thermo-plastic material, such as NYLON (T.M.) As can be seen from FIG. 2, the cam s has a rectangular cross-section which prevents any rotary movement thereof about its longitudinal axis.

I claim:

1. A mechanism for speed reduction and stopping of the film drive for use in cinematographic projectors, comprising a per se known claw drive acted on by first and second cams so as to give the claw end a rectangular profiled path, an elongated cam member displaceable between three operating positions, pusher means located on each side of the said elongated cam member and mounted to be displaceable laterally of the elongated cam member, one pusher means being adapted to co-operate with further cam means and the other pusher means being adapted to co-operate with the claw end, one position of the elongated cam member corresponding to the inoperative position of both pusher means, a second position of the elongated cam member effecting movement of said other pusher means to displace the claw end such that one of the first and second cams ceases to reciprocate the claw end, such that film transport ceases, the third position of the elongayed cam member coupling the pusher means so that said further cam means periodically causes said pusher means to inhibit the reciprocation of said claw end which results from the action of one of said first and second cams such that the speed of film transport is reduced.

2. A mechanism according to the claim 1 wherein the cam member is made of thermophastic material.

3. A mechanism according to claim 2 in which the pusher-means comprise elongate pusher-stems which are arranged co-axially of one another with their axes perpendicular to the longitudinal axis of the elongate cam member.

* * * * *